(12) United States Patent
Clements et al.

(10) Patent No.: US 6,524,636 B1
(45) Date of Patent: Feb. 25, 2003

(54) DOUBLE CHIP SAUCE DELIVERY SYSTEM (75) Inventors: Robert G. Clements, Minneapolis, MN (US); James Citti, Minneapolis, MN (US); Michael E. Bond, Wisconsin Rapids, WI (US)

(73) Assignee: General Mills, Inc., Minneapolis, MN (US)

( * ) Notice: Subject to any disclaimer, the term of this patent is extended or adjusted under 35 U.S.C. 154(b) by 0 days.

(21) Appl. No.: 09/560,255

(22) Filed: Apr. 26, 2000

(51) Int. Cl.$^7$ ................................ A23L 1/39; A23B 4/07
(52) U.S. Cl. ..................... 426/589; 426/393; 426/114
(58) Field of Search ................................ 426/90, 92, 100, 426/102, 106, 113, 114, 129, 130, 234, 302, 589, 650, 392, 393, 512, 516, 524

(56) References Cited

U.S. PATENT DOCUMENTS

| 2,801,930 A | 8/1957 | Paulucci |
| 3,567,468 A | 3/1971 | Tressler |
| 3,607,313 A | 9/1971 | Roth |
| 3,868,470 A | 2/1975 | Fallon et al. |
| 4,328,253 A | 5/1982 | von Kamienski et al. |
| 4,478,861 A | 10/1984 | Montgomery et al. |
| 4,927,650 A | 5/1990 | Roberts |
| 4,929,456 A | 5/1990 | Bejarano-Wallens et al. |
| 5,223,293 A | 6/1993 | Bain |
| 5,987,898 A | 11/1999 | Olofsson et al. |
| 6,007,859 A | 12/1999 | Taylor et al. |
| 6,183,789 B1 * | 2/2001 | Nilsson et al. ............... 426/113 |
| 6,251,447 B1 * | 6/2001 | Olofsson et al. ............... 426/90 |

FOREIGN PATENT DOCUMENTS

EP 0 923 883 6/1999

* cited by examiner

*Primary Examiner*—Keith Hendricks
(74) *Attorney, Agent, or Firm*—Annette M. Frawley; Douglas J. Taylor; Mark W. Binder (57) ABSTRACT

A frozen sauce delivery system provides a sauce for a frozen food product in the form of a plurality of frozen sauce chips. Depending on the type of sauce being provided, the sauce may be formed into one or more different types of chips. Each type of chip is formed from a mixture that may include a portion of the ingredients used to form the sauce. Each mixture is then apportioned and frozen as chips. The melting temperature of the chip ingredients can be formulated to be higher than the melting temperature of the overall sauce. A plurality of each type of sauce chip is then included in a package along with frozen food items to create the frozen food product. This frozen food product may then be prepared, preferably using heat, to form a finished food dish that includes heated food items coated in the heated sauce.

40 Claims, 5 Drawing Sheets

DOUBLE CHIP SAUCE DELIVERY SYSTEM

FIELD OF THE INVENTION

This invention relates to frozen food products, and more particularly to a frozen sauce delivery system for use with a frozen food product.

BACKGROUND OF THE INVENTION

Packaged frozen food items that include multiple food components, along with seasoning or sauces, have been available on the market for some time. Attempts to make such frozen foods more convenient and user friendly have produced products that include most, if not all, food items for a complete meal. These items may include vegetables, pasta or rice, and meat, poultry or other protein item. Some products require or suggest the addition of freshly cooked meat or poultry, instead of including pre-cooked and frozen meat or poultry in the product. Other products recommend or suggest serving the prepared product with freshly made rice or other starchy food item.

Convenience of the product is enhanced by the provision of sauces or sauce ingredients requiring little work during preparation on the part of the consumer/cook. Such sauces may be formed from coatings on some or all of the frozen food items in the package. These coatings reconstitute into sauces when the food items are heated and prepared for consumption. Alternately, the sauce may be provided in a separate container within the food product package. This container is then opened and the sauce added to the other food items during heating and preparation. These sauces replace sauce ingredient packets that must be mixed with the liquid ingredients, such as oil, butter, or water, to form a suitable sauce.

A frozen food product of the prior art may be formed in part from a plurality of frozen food items, such as frozen vegetables, pastas, meats, poultry, rice, legumes or other food items. The frozen food product may contain all of the same food item, such as all of one type of vegetable. Alternatively, the frozen food product may contain a mixture of just vegetables but of different types, a mixture of vegetables with a starch, such as pasta or rice, or a general blend of vegetables, starches and meats or poultry. The frozen food product also typically includes some type of frozen sauce.

The frozen food product is designed to produce a finished food dish upon preparation, such as by cooking. The finished food dish is often a heated combination of the food items of the food product and the sauce that coats the food items. The frozen food product may be configured such that the finished food dish is combinable with other food items not included in the frozen food product. These items may include freshly cooked meats or poultry, previously cooked meats or poultry, or freshly cooked rice, pasta or other starch.

The types of sauces provided in the frozen food product may include savory sauces that may be primarily water based sauces with other ingredients, such as flavoring and thickening ingredients, cheese sauces, cream sauces, or tomato-based sauces. These sauces are typically formed from a plurality of different ingredients, including both liquids and solids. The liquids may include, for example, water, vinegar, soy sauce, or oil. The solids may include, for example, corn starch or other thickening agents, sugar, garlic, ginger, xanthan gum, pepper, and/or other herbs, spices or seasonings.

When combined together into a sauce, these types of sauce ingredients often result in a depressed melting point. That is, a particular combination of sauce ingredients will melt at a temperature well below the melting point of water, which may be below 0° F., and often is below industry standard temperatures for refrigeration and freezing equipment. Based on industry standard temperatures for storage and transportation equipment, a preferred melting temperature for such a sauce is in the range of about 20° F.±10° F. With the temperature variations that occur between product formation, shipping, warehouse storage, retail display and/or consumer home storage, such a frozen sauce may often exist in a semi-frozen state and thus must be packaged in a separate container in a frozen food product so as not to cause a mess inside the frozen food product package.

Attempts to simplify meal preparation for consumers by providing all of the ingredients in one frozen package have encountered various problems. One of these problems is the loss of sauce intensity due to manipulation of the sauce ingredients for improved handling and delivery, such as coating of the frozen food items. Another such problem is the increased mess and waste dueto the handling and emptying of containers of frozen or semi-frozen sauce. In addition, another problem is the loss of portion control due to the provision of a single sauce container for an entire package of food items

SUMMARY OF THE INVENTION

The present invention is an improved frozen sauce delivery system in which the sauce for a frozen food product is provided in the form of a plurality of frozen sauce chips. No coating of frozen food items within the frozen food product is required. Depending on the type of sauce being provided, the sauce may be formed into one or more different types of chips. Each type of chip is formed from a mixture that may include a portion of the ingredients used to form the sauce. Each mixture is then apportioned and frozen as chips. The melting temperature of the chip ingredients can be formulated to be higher than the melting temperature of the overall sauce. A plurality of each type of sauce chip can be included in a package along with frozen food items to create the frozen food product. This frozen food product may then be prepared, preferably using heat, to form a finished food dish that includes heated food items coated in the heated sauce.

The frozen sauce delivery system of the present invention can efficiently deliver sauce having enhanced flavor to the finished food dish due to the increased ability to provide relatively higher quantities of solids, such as seasonings, herbs and other flavorings, per volume of sauce. The multi-chip system is easy to use for a consumer, resulting in relatively low mess and waste. This system is also relatively easy to handle during production and packaging, resulting in low costs. An added benefit of portion control by the consumer/cook makes the present invention a user friendly and an economical frozen food product.

DETAILED DESCRIPTION OF THE INVENTION

Figure 1:
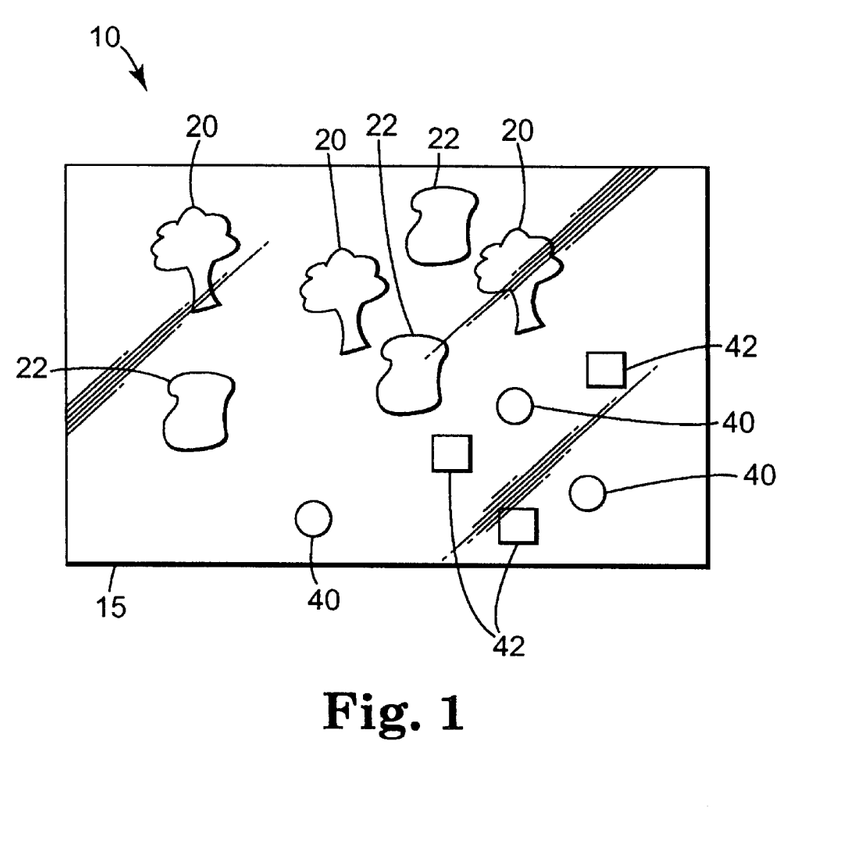
FIG. 1 is an illustration of one embodiment of a frozen food product including the frozen sauce delivery system of the present invention.

With reference to the attached Figures, it is to be understood that like components are labeled with like numerals throughout the several Figures. The present invention is an improved sauce delivery system for a frozen food product that, when prepared, preferably produces a hot finished food dish including a sauce and food items that are coated with the sauce. Referring to FIG. 1, a frozen food product 10 includes a plurality of frozen food items 20, 22, that may be all the same type of food or may be different types of food, including but not limited to vegetables, meats, poultry, pasta and rice. The frozen food items 20, 22 are preferably individually quick frozen and are provided in a quantity based on the number of recommended servings to be prepared from the frozen food product 10. The frozen food product 10 is preferably provided in a package or container 15, such as a plastic bag, to facilitate storage, transport, display and other handling of the frozen food product 10.

The frozen food product 10 also includes a plurality of frozen sauce chips 40, 42.that produce the sauce upon preparation of the frozen food product 10. The number of sauce chips 40, 42 provided depends upon the desired volume of sauce in the finished food dish. Each sauce chip 40, 42 is formed format least a portion of the ingredients that make up the sauce. Depending on the formulation of a particular sauce, one or more types of sauce chips, as shown by first sauce chip 40 and second sauce chip 42, may be provided in the frozen food product 10.

A particular sauce formulation has a corresponding sauce melting temperature that may be below industry standard temperatures for storage and transportation of food products, as described in the Background of the Invention section. In order to deliver the frozen sauce without the need for separate containers within the frozen food product package 15, the melting temperature of the sauce should be within or above the industry standard range of temperatures. It has been found that by separating the ingredients of the sauce into two or more mixtures, the melting temperature of each mixture may be manipulated to fall within the desired industry range, even though the sauce as a whole has a melting temperature below the industry range.

For sauce formulations having melting temperatures below the industry range, each sauce chip 40, 42 would preferably contain only a portion of the desired ingredients of the sauce. In this situation more than one type of sauce chip 40, 42 would preferably be provided in the frozen food product. During preparation, the first and second frozen sauce chips 40, 42 thaw so that the ingredients in each chip 40, 42 combine together to produce the desired sauce, which then coats the heated food items 20, 22 in the finished food dish.

As an example, in a savory sauce the melting temperature is typically below industry standards. For this sauce, the water based ingredients may be combined with a few solid additives in a first mixture to achieve a first sauce chip 40 that has a melting temperature in the industry range. Some solid additives must be provided in a water base in order to retain their flavor or their functionality. The bulk of the solid ingredients of the sauce may then be combined in an oil base as a second mixture to achieve a second sauce chip 42 that also has a melting temperature in the industry range. A plurality of each of the first water based chips 40 and a plurality of the second oil based chips 42 may then be combined together with the frozen food items 20, 22 in the frozen food product 10, such that the when the first and second sauce chips 40, 42 thaw, the first and second mixtures combine to produce the savory sauce.

Figure 2:
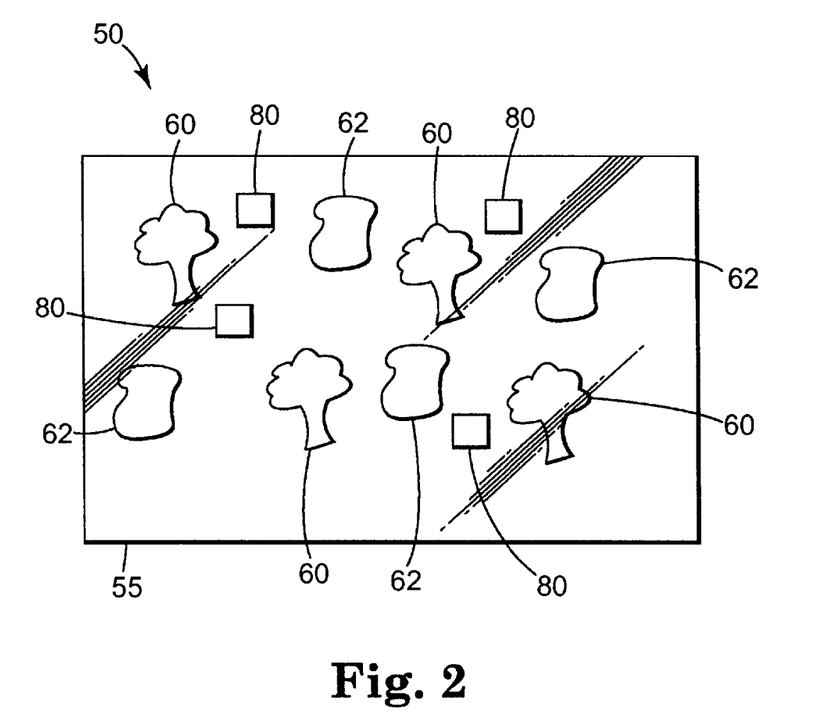
FIG. 2 is an illustration of another embodiment of a frozen food product including the frozen sauce delivery system of the present invention.

Referring now also to FIG. 2, for sauce formulations having melting temperatures within or above the industry range, only one type of sauce chip 80 would preferably be provided in a frozen food product 50. Each sauce chip 80 would then preferably contain all of the desired ingredients of the sauce. During preparation, the plurality of sauce chips 80 melt and combine to provide the sauce for the finished food dish.

First and second sauce chips 40, 42 are formed by mixing the desired ingredients for each type of chip separately and then freezing small portions of these mixtures individually. Mixing of the ingredients may be achieved using standard industry mixing equipment. The resulting mixtures are then transported to a mechanism for forming the chips. Numerous types of equipment for mixing, pumping, liquid/slurry transport, and freezing are available and known in the industry. Any suitable combination of such equipment may be used with and is within the contemplation and scope of the present invention.

Figure 3:
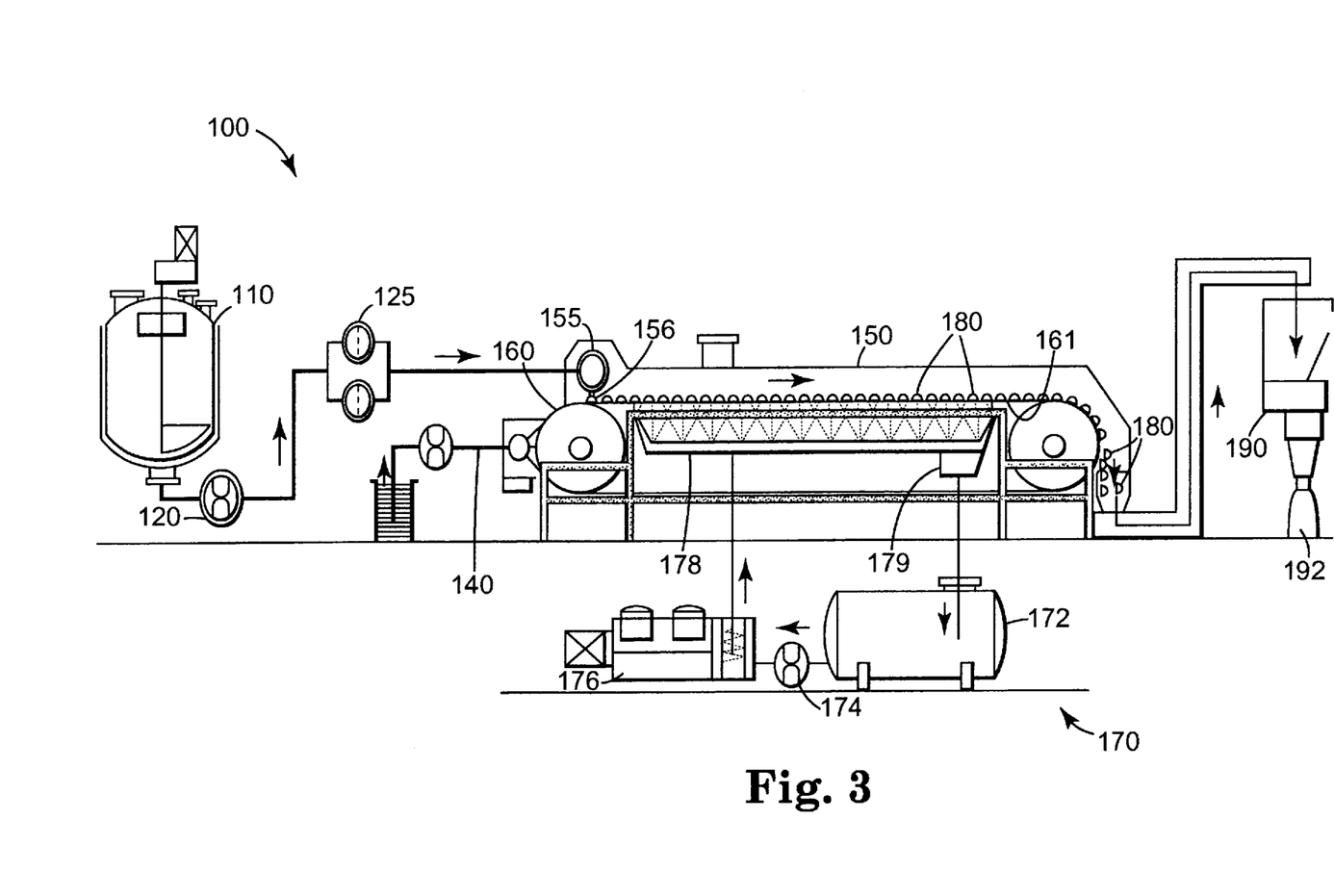
FIG. 3 is an elevation view of one embodiment of processing line which can be used to form the sauce chips shown in FIGS. I and 2.

Referring now to FIG. 3, one example of chip forming equipment 100 is shown having a mixer 110 and a chip former 150. The desired ingredients of a particular type of sauce chip are placed in the mixer 110 and blended as desired. A pump 120 transfers the resulting mixture from the mixer 110 to the chip former 150. An optional filter 125 may be provided inline between the pump 120 and chip former 150, if desired.

The chip former 150 includes a depositing portion 155 that places a plurality of mixture portions 156, each of a predetermined volume, onto a moving belt 160. The belt 160 is preferably formed from stainless steel and is cooled on the underside 161 by a cooling system 170. The cooling system 170 includes a cooling solution tank 172, a pump 174, a chiller 176 and an underbelt spray system 178. Chilled solution from the tank 172 is sprayed onto the underside 161 of belt 160 by the underbelt spray system 178. A return mechanism 179 recycles the used solution back into the tank 172 for reuse. Although shown with a cooling solution system, it is to be understood that other cooling systems may also be used for chip formation, including liquid nitrogen or carbon dioxide.

The cooled belt 160 rapidly freezes the deposited mixture portions 156 into individual frozen sauce chips 180. A release agent applicator 140 may be used to apply a release agent to the surface of the belt 160 prior to deposit of the mixture portions 156 to aid in removal of the frozen sauce chips 180. The frozen sauce chips 180 are collected at the end of the belt 160 and conveyed to a bagging system 190 that places a suitable number of the chips 180 into a desired container 192 for later processing. Although shown as round pastille type units, the frozen sauce chips 180 may alternately be formed in other shapes, such as, for example, cubes, blocks or nuggets. Suitable chip forming equipment is commercially available from industry sources, such as Sandvik Process Systems, Inc. of Totowa, N.J., or York Refrigeration Group of Northfield, Minn.

The formulation of each of the mixtures may be adjusted to optimize their ability to be mixed, transported and deposited. For example, it has been found that granulated sugar may cause problems including jamming in the pumping and depositing processes. Tests have demonstrated that these problems can be alleviated by substituting powdered sugar for the granulated sugar without appreciable flavor, texture or appearance differences. The powdered sugar mixture exhibited significantly less clogging in the depositing system and no appreciable pumping problems were identified. It was also found that the addition of lecithin to the oil based sauce chip mixture, prior to the addition of other dry/solid ingredients, acted like a lubricant, thereby improving pumping efficiency and viscosity related characteristics of the mixture. In addition, the solid ingredients stayed in suspension better with the addition of lecithin to the oil based mixture. Although lecithin was tested, other emulsifiers may also be used and are within the scope of the present invention.

Figure 4:
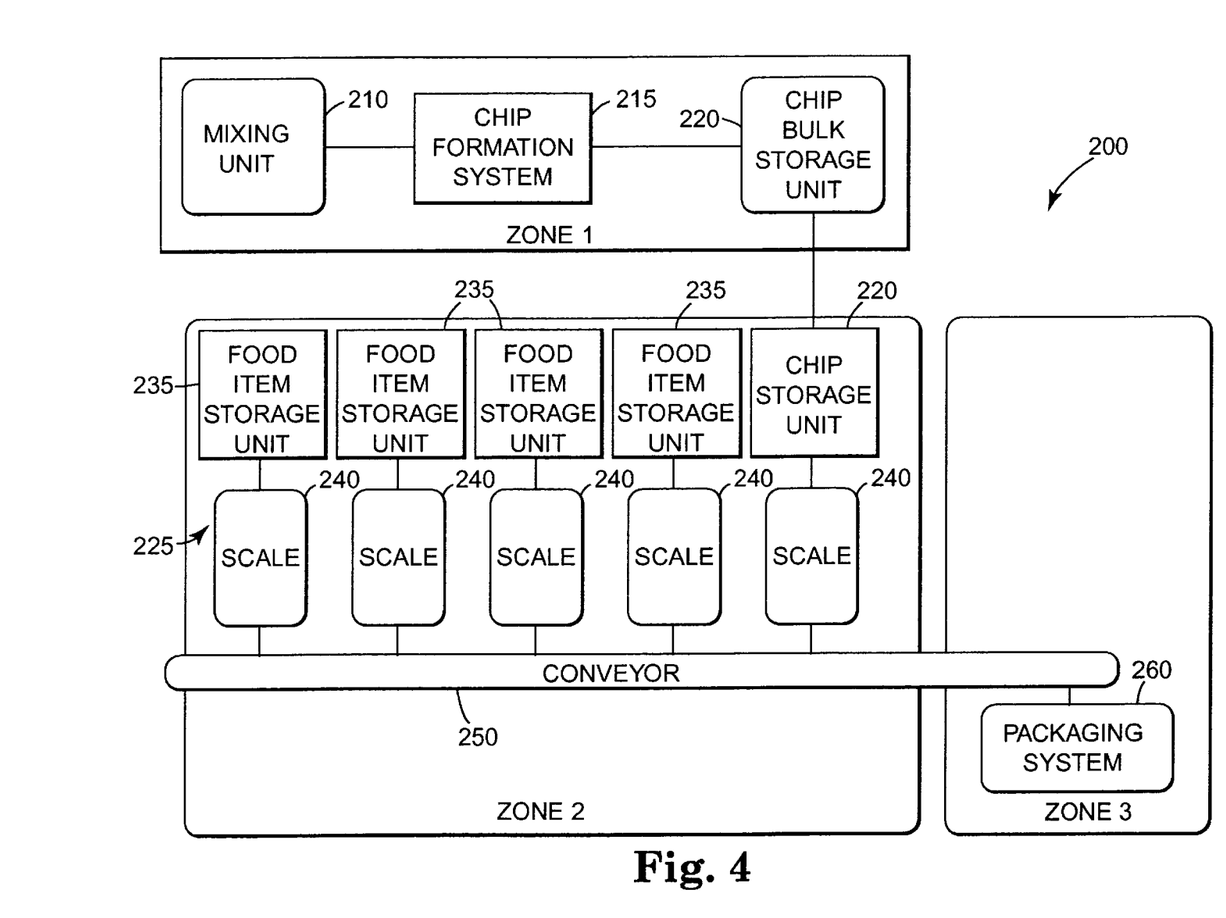
FIG. 4 is a schematic illustration of a frozen food product production system including sauce chip formation of the present invention.

With reference again to FIG. 2, once the frozen sauce chips 80 are formed they are combined with other frozen food items 60, 62 to produce the frozen food product 50. FIG. 4 is a schematic illustration of a system 200 for production of the packaged frozen food product 50, including sauce chip formation, frozen food product formation and frozen food product packaging. In Zone 1, the ingredients for the chip 80 are blended in a mixing unit 210 before a chip formation system 215 deposits and freezes the mixture to form a plurality of frozen sauce chips 80. These chips 80 are placed in bulk storage units 220 within freezers for later use.

In Zone 2, the bulk storage units 220 containing sauce chips 80 are loaded along with similar bulk storage units 235 containing various frozen food, items 60, 62, such as vegetables, pasta, or meat, into a dispensing system 225. A plurality of scales 240, such as Ishida food scales available from Ishida Corporation of America in Tucker, Ga., dispense a predetermined quantity of frozen sauce chips 80 and other frozen food items 60, 62 from the bulk storage units 220, 235. The amount of sauce chips 80 and frozen food items 60, 62 dispensed will depend on the type of sauce being formed, the quantity of sauce desired in the finished food dish, the quantity of sauce in each chip, the types of food items provided and the combination of food items required for the finished food dish. The dispensed quantities of sauce chips 80 and food items 60, 62 are transported together by a conveyor 250. Although only one bulk storage container 220 of sauce chips 80 is shown, it is to be understood that a plurality of such containers 220, each containing the same or a different type of sauce chip, may also be provided as desired for the final frozen food product 50. It is also to be understood that the processes performed by Zone 2 may occur immediately after the processes performed by Zone 1 in time, or may occur after some time delay.

In Zone 3, the dispensed quantity combination of sauce chips 80 and frozen food items 60, 62 are transported by the conveyor 250 to a packaging system 260. Alternately, the sauce chips 80 and frozen food items 60, 62 may be dispensed directly to the packaging system 260, thereby eliminating the need for the conveyor 250. The packaging system 260, in turn, places the sauce chips 80 and frozen food items 60, 62 into the package 55 forming the packaged frozen food product 50. Both Zones 2 and 3 necessarily function at suitable temperatures to maintain the frozen state of the sauce chips 80 and frozen food items 60, 62, as well as the resulting frozen food product 50. Packaged frozen food products 50 are then stored, shipped and otherwise handled under suitable temperatures for ultimate display and sale to consumers.

Figure 5:
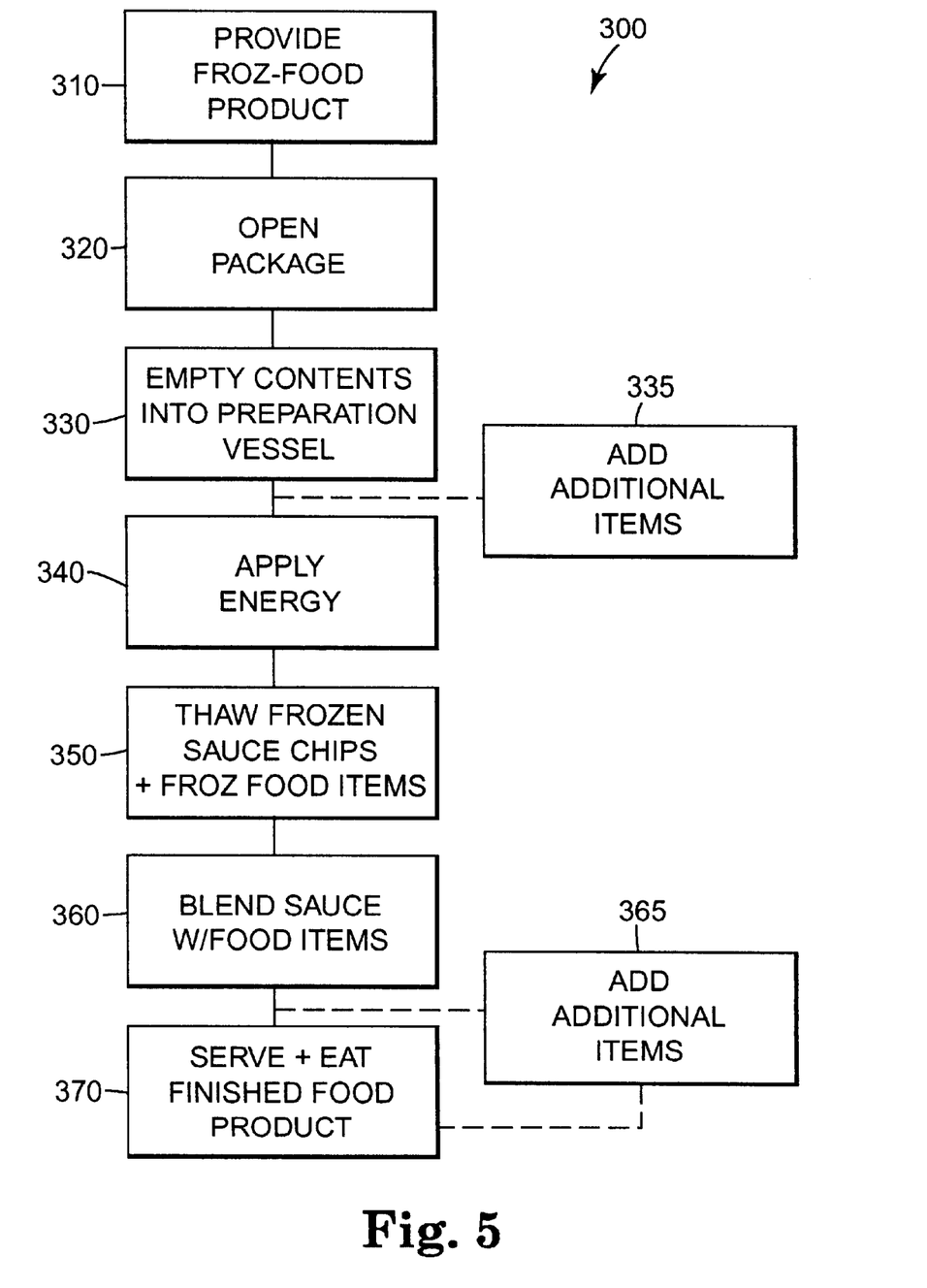
FIG. 5 is a flow chart illustrating a process for preparing a finished food dish from the frozen food product shown in FIG. 2.

FIG. 5 is a flow chart illustration of the steps of a process 300 for preparing and using the frozen food product 50 to produce a finished food dish. In step 310, the frozen food product 50 is provided to a user, such as to a consumer through sale of the product 50. In step 320, the user opens the package 55 and, in step 330, preferably places the contents (frozen sauce chips 80 and frozen food items 60, 62) of the frozen food product 50 into a vessel, such as a pan, pot casserole or dish. At this stage of the preparation process 300, in optional step 335, additional food items may be added to the vessel, including oil, water, cooked or uncooked meat and/or poultry.

In step 340, energy, such as heat, microwaves, or other energy means suitable for food preparation, is applied to the vessel and, thus, the frozen sauce chips 80 and frozen food items 60, 62, by a stove top range, microwave oven or other source. The heat caused by the application of energy then thaws the frozen food items 60, 62 and the frozen sauce chips 80, in step 350. In step 360, the user blends the heated food items 60, 62 and sauce chips 80, such as by stirring, combining the thawed sauce chip mixtures to create the sauce, which then coats the heated food items 60, 62. In optional step 365, additional food items may also be added, including cooked meats or poultry, cooked rice or pasta, and/or peanuts or other additives. The finished food dish is then ready to be served and consumed in step 370. Optionally, the finished food dish may be combined with other food items, in step 365, at the serving stage, such as by ladling over cooked rice or pasta and/or covering with toppings, before consumption.

If the user does not need or want the entire quantity of the finished food dish for current consumption, the user has the option of preparing only a portion of the frozen food product 50. Instead of emptying the entire contents of the frozen food product 50 into the vessel for heating, the user may place desired portions of the frozen food items 60, 62 and frozen sauce chips 80 into the vessel. The user then proceeds with the remainder of the preparation steps 335 to 370, thereby producing a smaller quantity of the finished food dish. This ability may save consumers money by allowing the consumer to prepare only the amount needed or desired at the time of preparation, instead of forcing the consumer to prepare the entire frozen food product 50 and store leftovers or throw the unwanted quantity in the garbage. Preparation of only a portion of the frozen food product 50 with products that include a separate sauce container may be possible however such preparation would tend to be messy and inconvenient, if not difficult for the consumer.

With the frozen sauce chip sauce delivery system of the present invention, apportioning of the sauce in its frozen state during dispensing of the frozen food items 60, 62 is not only possible, but is user friendly. The frozen sauce chips 80 may be formed in weights and sizes similar to the other frozen food items 60, 62, that is each frozen sauce chip 80 has a size and weight that is similar to the size and weight of each vegetable, meat morsel or pasta noodle. With similar weights and sizes, the likelihood of even distribution of sauce chips 80 throughout the frozen food product 50 is maximized, thereby increasing the likelihood of equal dispensing of sauce chips 80 along with frozen food items 60, 62 when poured from the package 55 by the user. This ability maximizes the likelihood that a frozen food product 50 divided by the user into two or more portions will contain about the same amount of sauce in each portion.

The frozen sauce delivery system of the present invention provides sauce for a frozen food product in the form of a plurality of frozen sauce chips. Depending on the type of sauce being provided, the sauce may be divided into one or more mixtures containing at least a portion of the sauce ingredients. Each mixture has a melting temperature within the acceptable industry standard range.

The sauce ingredient mixtures are frozen to form the frozen sauce chips, and then are collected and handled in the same manner as the frozen food items also included in the frozen food product. The ability of the frozen sauce chips to be handled like the other frozen food items results in overall cost reductions in the manufacture of the frozen food products by eliminating the additional equipment and separate handling of the frozen sauce, such as is necessary for the separate sauce containers described above in the Background of the Invention section.

The sauce delivery system of the present invention results in prepared sauces having at least equivalent taste, texture, and appearance as the sauces currently available in a separate container format. Integrity of the intensity of the flavor is maintained and additives that may be considered undesirable by consumers are generally not needed in the formation of the sauce chips. In addition, no coating of the food items in a frozen state during manufacture of the frozen food product is necessary to provide a suitable sauce in the finished food dish. The sauce chip delivery system allows greater quantities of solid ingredients to be included in the sauce, as well as greater quantities of sauce to be included in the frozen food product, than are possible with current frozen food coating techniques. Such increased quantities provide enhanced flavor and increased volume of sauce to the finished food dish, both of which are desired by the consumer. Thus, the frozen sauce chip sauce delivery system of the present invention has numerous benefits for both the manufacturer and the consumer.

EXAMPLE

Teriyaki Sauce Chips

A teriyaki sauce formulation was produced as frozen sauce chips to be combined with frozen vegetables for a trained panel taste test evaluation. The teriyaki sauce ingredients were divided into a water based, reduced solids mixture having the ingredients shown in Table 1, and an oil based mixture having the ingredients shown in Table 1.

TABLE 1

Teriyaki Sauce Chip Ingredients and Quantities

| Ingredient | % (about) | Pounds (about) | Grams per bag |
|---|---|---|---|
| Water based chip | | | 127.63 |
| Softened Water | 71.9 | 1121.51 | |
| Soy Sauce | 18.4 | 286.89 | |
| Corn Starch, modified | 3.7 | 57.57 | |
| Cider Vinegar, 50 grain | 3.3 | 51.81 | |
| Rice Vinegar, 100 grain | 1.7 | 26.87 | |
| Garlic Puree | .6 | 9.59 | |
| Xantham Gum | .4 | 5.76 | |
| Oil based chip | | | 46.08 |
| Soy Bean Oil | 36.01 | 259.06 | |
| Dehydrated Soy Sauce | 21.84 | 157.12 | |
| Powdered Sugar | 39.86 | 286.76 | |
| Ginger, ground | 1.02 | 7.34 | |
| Mustard Flour | .68 | 4.89 | |
| Black Pepper | .34 | 2.45 | |
| Lecithin | .25 | 1.80 | |

The two sets of sauce ingredients were each mixed in a pilot plant size high shear mixer. The resulting two mixtures were deposited on cold trays by hand using a syringe or by a small, six valve filler and the trays of mixture deposits were then frozen in a freezer or on dry ice. The frozen sauce chips were scraped off of the tray and combined with frozen broccoli to create a testable frozen food product, similar to a commercially available Green Giant Create-A-Meal™ Teriyaki Stir Fry.

The combination of sauce chips and broccoli were then prepared using the above described preparation techniques to produce a finished food dish. The sauce from a currently available packaged Create-A-Meal™ Teriyaki Stir Fry that provides sauce in a separate container was also prepared with frozen broccoli using preparation techniques recommended on the package. The resulting two sauce coated broccoli dishes were then taste tested by a trained panel, in a triangle test, wherein each panelist tasted three separate samples and tried to identify the odd sample. The test resulted in a 95% confidence interval that there is no detectable taste difference between the two sauces.

Although the present invention has been described with reference to preferred embodiments, workers skilled in the art will recognize that changes may be made in form and detail without departing from the spirit and scope of the invention. In addition, the invention is not to be taken as limited to all of the details thereof as modifications and variations thereof may be made without departing from the spirit or scope of the invention.

What is claimed is:

1. A frozen food product for preparation of a sauce inclusive food dish, the frozen food product comprising:
   a plurality of frozen food elements;
   at least one frozen chip that includes a first composition of partial ingredients of a sauce; and
   a second composition of partial ingredients of the sauce that is different than the first composition of partial ingredients,
   wherein the first composition of partial sauce ingredients of the frozen chip can, when thawed, combine with the second composition of partial sauce ingredients to form the sauce for at least partially coating the food elements.

2. The frozen food product of claim 1, further comprising a plurality of frozen sauce chips.

3. The frozen food product of claim 1, wherein the first portion of sauce ingredients comprise a portion of the ingredients of a butter sauce that when combined with the second portion of sauce ingredients creates a butter sauce.

4. The frozen food product of claim 1, wherein the first portion of sauce ingredients comprise a portion of the ingredients of a cheese sauce that when combined with the second portion of sauce ingredients creates a cheese sauce.

5. The frozen food product of claim 1, wherein the second portion of sauce ingredients comprises at least one second frozen sauce chip that includes the second portion of ingredients for the sauce, and wherein the first and second frozen sauce chips, when thawed, can combine to produce the sauce for coating the food elements.

6. The frozen food product of claim 5, further comprising a plurality of first and second frozen sauce chips.

7. The frozen food product of claim 5, wherein the sauce has a corresponding sauce melting temperature, and wherein the first portion of ingredients for the sauce and the second portion of ingredients for the sauce each have corresponding first and second sauce chip melting temperatures, respectively, that are higher than the sauce melting temperature.

8. The frozen food product of claim 1, further comprising a package that contains the frozen food elements and the at least one frozen sauce chip.

9. A frozen food item for preparation of a sauce inclusive food dish, the frozen food item comprising:
   a plurality of frozen food elements;

a first frozen chip that includes a first composition of partial ingredients for a sauce; and a second frozen chip that includes a second composition of partial ingredients of the sauce that is different than the first composition of partial ingredients for the sauce, wherein the first and second compositions of partial ingredients for a sauce of the respective first and second frozen chips, when thawed, can combine together to produce the sauce for at least partially coating the food elements.

10. The frozen food item of claim 9, wherein the sauce has a corresponding sauce melting temperature, and wherein the first portion of ingredients for the sauce and the second portion of ingredients for the sauce each have corresponding first and second sauce chip melting temperatures, respectively, that are higher than the sauce melting temperature.

11. The frozen food item of claim 9, further comprising a plurality of first and second sauce chips.

12. The frozen food item of claim 9, wherein the plurality of frozen food elements are all the same food.

13. The frozen food item of claim 9, wherein the plurality of frozen food elements comprise a variety of different foods.

14. The frozen food item of claim 9, wherein the first frozen sauce chip comprises an oil based seasoning chip and the second sauce chip comprises a water based reduced solids chip.

15. The frozen food item of claim 14, wherein the oil based seasoning chip comprises an oil and at least one seasoning.

16. The frozen food item of claim 15, wherein the at least one seasoning includes powdered sugar.

17. The frozen food item of claim 15, wherein the at least one seasoning includes dehydrated soy sauce.

18. The frozen food item of claim 15, wherein the oil based seasoning chip further comprises an emulsifier.

19. The frozen food item of claim 18, wherein the emulsifier comprises lecithin.

20. The frozen food item of claim 14, wherein the water based reduced solids chip comprises water and at least one other liquid ingredient.

21. The frozen food item of claim 14, wherein the water based reduced solids chip further comprises at least one solid ingredient.

22. The frozen food item of claim 9, further comprising a package that contains the frozen food elements, the first frozen sauce chip and the second frozen sauce chip.

23. A method of producing a sauce inclusive food dish prepared from a frozen food product, the method comprising the steps of:
providing a frozen food product including a plurality of frozen food items in combination with at least one frozen chip that includes a first composition of partial sauce ingredients of a sauce and further in combination with a second composition of partial ingredients of the sauce that is different than the first composition of partial ingredients; and thawing at least the frozen chip and thereafter combining the first composition of partial sauce ingredients with the second composition of partial sauce ingredients to produce the sauce that at least partially coats the food items.

24. The method of claim 23, further including a step of applying energy to the food product that can thaw and heat the combination of frozen food items and the frozen sauce chip.

25. The method of claim 24, further including a step of placing the frozen food items and the frozen sauce chip in a vessel prior to applying energy.

26. The method of claim 23, further including a step of adding a liquid to the food product.

27. The method of claim 23, further including a step of adding additional food items to the food product.

28. The method of claim 27, wherein the additional food items are selected from the group consisting of meat and poultry.

29. The method of claim 23, wherein the frozen food product includes a plurality of frozen sauce chips.

30. The method of claim 23, wherein the frozen food product further comprises a package that contains the frozen food items and the frozen sauce chip, and further including a step of opening the package and removing the frozen food items and frozen sauce chip.

31. A method of producing a sauce inclusive food dish prepared from a frozen food product, the method comprising the steps of:
providing a frozen food product including a first frozen chip and a second frozen chip in combination with a plurality of frozen food items, the first frozen chip formed from a first composition of partial ingredients for a sauce and the second frozen chip formed from a second composition of partial ingredients of the sauce that is different than the first composition of partial ingredients; and thawing at least the first and second frozen chips and combining the first composition of partial ingredients for a sauce with the second composition of partial ingredients for the sauce to produce the sauce that at least partially coats the food items.

32. The method of claim 31, wherein the sauce has a corresponding sauce melting temperature, and wherein the first portion of ingredients for the sauce and the second portion of ingredients for the sauce each have corresponding first and second sauce chip melting temperatures, respectively, that are higher than the sauce melting temperature.

33. The method of claim 31, wherein the frozen food product includes a plurality of first and second frozen sauce chips.

34. A method of manufacturing a frozen food product for preparation of a sauce inclusive food dish, the method comprising the steps of:

providing a plurality of frozen food items;

providing a plurality of frozen chips, the plurality of chips including a first composition of partial ingredients of a sauce, the frozen chips made by mixing a plurality of sauce ingredients to form a partial ingredient sauce mixture, and freezing the partial ingredient sauce mixture into a plurality of sauce chips;

providing a second composition of partial ingredients of the sauce that is different than the first composition of partial ingredients of the sauce; and combining the plurality of frozen food items with the frozen chips and the second composition of partial ingredients of the sauce to form the frozen food product, wherein the first composition of partial ingredients of the sauce of the frozen chips can, when thawed, combine with the second composition of partial ingredients of the sauce to form the sauce that at least partially coats the food items.

35. The method of claim 34, combined with a further step of packaging the frozen food product to create a packaged frozen food product.

36. A method of manufacturing a frozen food product for preparation of a sauce inclusive food dish, the method comprising the steps of:

provingd a plurality of frozen food items;

providing a plurality of first and a plurality of second frozen chips, the first and second frozen chips made by providing sauce ingredients; mixing a first composition of partial sauce ingredients to form a first sauce mixture and mixing a second composition of partial ingredients of the sauce that is different than the first composition of partial ingredients to form a second sauce mixture; and freezing the first sauce mixture into a plurality of first frozen chips and freezing the second sauce mixture into a plurality of second frozen chips; and combining the plurality of frozen food items with the first and second frozen chips to form the frozen food product, wherein the first composition of the partial sauce ingredients of the first frozen chips and the second composition of partial sauce ingredients of the second frozen chips can, when thawed, combine to form the sauce that at least partially coats the food items.

37. The method of manufacturing of claim 36, combined with a further step of packaging the frozen food product to create a packaged frozen food product.

38. The method of manufacturing of claim 37, wherein the step of combining further comprises mixing the first and second frozen sauce chips with the frozen food items.

39. The method of manufacturing of claim 38, wherein the step of combining further comprises feeding quantities of the frozen food items and first and second frozen sauce chips into a collector using automatic feeders, and wherein the step of packaging further comprises receiving the combined frozen food items and first and second frozen sauce chips from the collector.

40. The method of manufacturing of claim 39, further comprising the step of weighing the frozen food items and first and second frozen sauce chips before they are collected.

* * * * *